Oct. 24, 1939.  B. G. CARLSON  2,177,242
AIRCRAFT AUTOMATIC PILOT
Filed Sept. 11, 1937  3 Sheets-Sheet 1
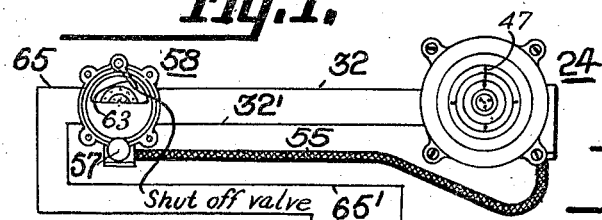
Fig.1.
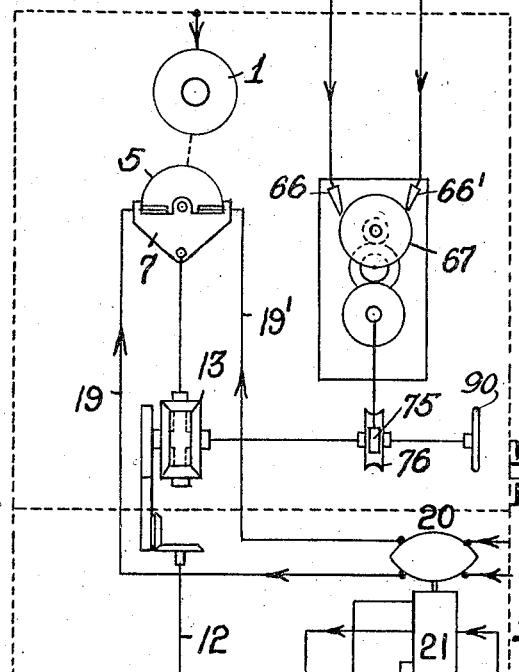
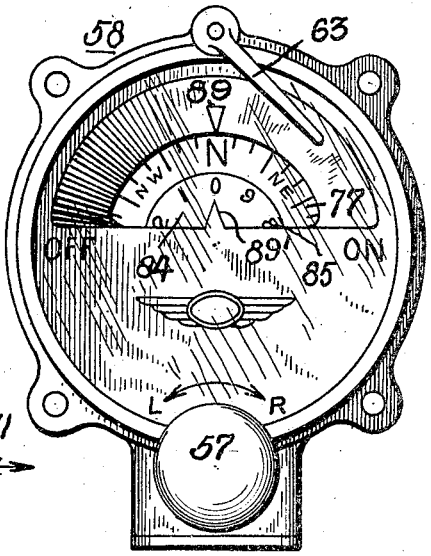
Fig.2.
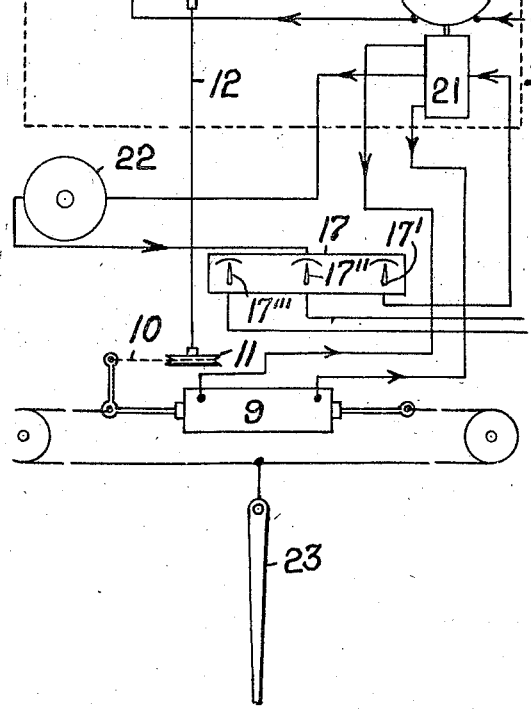
Fig.3.
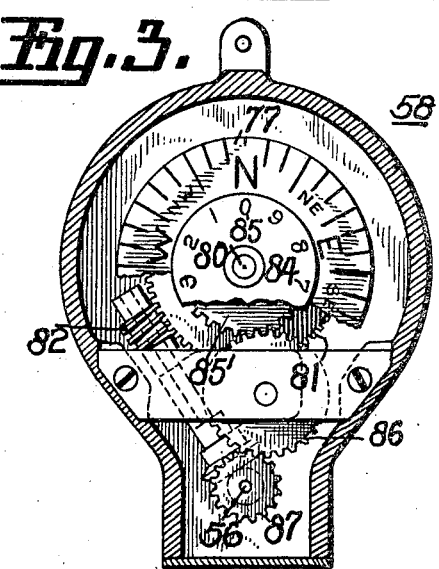
INVENTOR
*Bert G. Carlson*
BY
*Herbert H. Thompson*
HIS ATTORNEY.

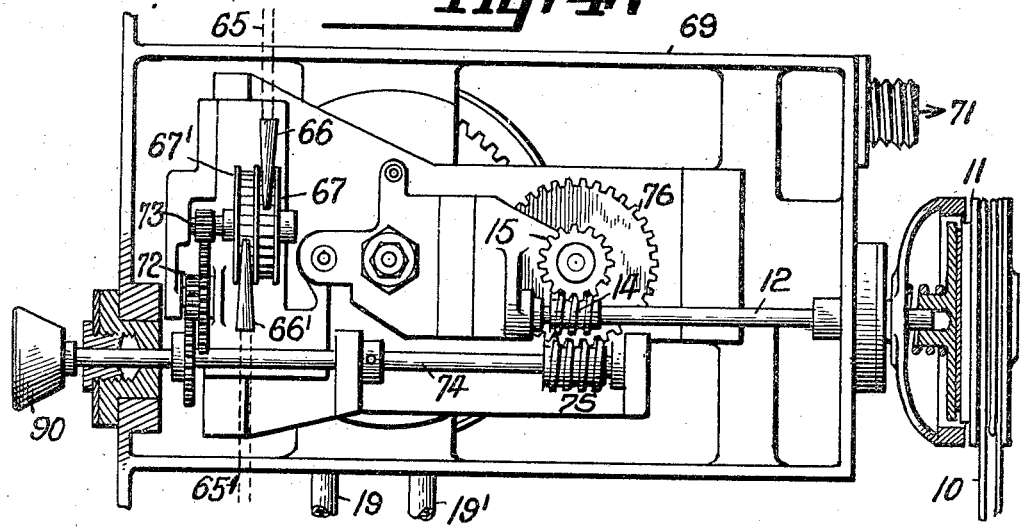

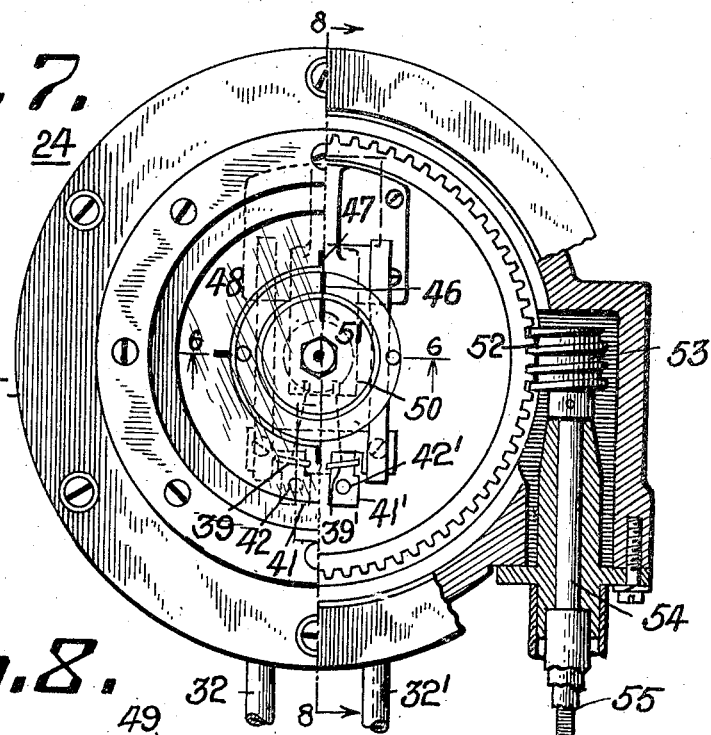

Patented Oct. 24, 1939

2,177,242

UNITED STATES PATENT OFFICE 2,177,242

AIRCRAFT AUTOMATIC PILOT

Bert G. Carlson, Freeport, N. Y., assignor to Sperry Gyroscope Company, Inc., Brooklyn, N. Y., a corporation of New York Application September 11, 1937, Serial No. 163,343

14 Claims. (Cl. 244—79)

This invention relates, generally, to automatic pilots for aircraft, and the invention has reference, more particularly, to a novel means for correcting for the wander of an azimuth or directional gyroscope through use of a magnetic compass in conjunction therewith, the said means constituting essentially an improvement upon the type of automatic pilot disclosed in my prior Patent No. 1,992,970 joint with Elmer A. Sperry and Mortimer F. Bates, although this invention is also applicable to other types of automatic pilots.

The principal object of the present invention lies in the provision of novel means for correcting for the wander of an automatic pilot directional gyroscope by changing the base line thereof through use of a magnetic compass and without precessing the gyroscope, the connections between the magnetic compass and gyroscope being such that the rate of change of the gyroscope base line is much slower than the rate of turn of the magnetic compass in its natural period, so that the base line is not affected and hence the heading of the craft is not changed by temporary oscillations or deviations of the magnetic compass, whereby the craft is maintained steady on its course without hunting due to the fixity characteristic of free gyroscopes, remote control means being provided for changing course, when desired.

Another object of the present invention is to provide a novel means of the above character employing a magnetic compass located at any convenient position on the craft and provided with pneumatic pick-off means connected for operating small turbine wheels at the directional gyroscope of the automatic pilot in the event the craft changes heading owing to wander of the gyroscope, the said turbine wheels being connected through reduction gearing for shifting the base line of the gyroscope to thereby cause the return of the craft to its correct heading, a remote course changing means being provided, as at the pilot's instrument board, and positively connected to the magnetic compass for shifting the pick-off thereof to effect a change in the heading of the craft in event it is desired to change course.

Other objects and advantages will become apparent from the specification, taken in connection with the accompanying drawings wherein one embodiment of the invention is illustrated.

In the drawings:

Fig. 1 is a diagrammatic view illustrating the parts of an automatic pilot associated with the steering of an aircraft and embodying the improvements of the present invention.

Fig. 2 is a view in front elevation of the course changing unit of the automatic pilot.

Fig. 3 is a vertical transverse sectional view, with parts broken away, of the course changing unit of Fig. 2.

Fig. 4 is a plan view, partly in section, of the directional gyro unit.

Fig. 5 is a vertical fore and aft sectional view of the course changing unit of Fig. 2.

Fig. 6 is an enlarged fragmentary sectional view taken along line 6—6 of Fig. 7.

Fig. 7 is a plan view, with parts broken away, of the magnetic compass unit.

Fig. 8 is an enlarged sectional view taken along line 8—8 of Fig. 7, and

Fig. 9 is a side view, partly in section, of the directional gyro unit.

Similar characters of reference are used in all of the above figures to indicate corresponding parts.

Referring now to Figs. 1, 4 and 9, a directional gyroscope is illustrated of a type similar to that disclosed in the prior mentioned patent. The gyro rotor 1 is air spun and journaled in a normally horizontal axis in rotor bearing frame 2 which is mounted for oscillation about a second horizontal axis 3 in the vertical ring 4, the latter being journaled for rotation about a vertical axis. The control or pick-off for steering is obtained from a semicircular control disc 5 secured to the vertical ring 4 and cooperating with air nozzles or ports 6, 6' of a rotatable framework 7.

The framework 7 is pivotally mounted on a bearing block 18 coaxial with the vertical axis of ring 4, and air is supplied to the nozzles 6, 6' through passages 8, 8' connected with pipes 19, 19' leading to diaphragm relay 20 controlling a master valve 21, that in turn controls the supply of pressure fluid from pump 22 to the hydraulic rudder servo motor 9 operating rudder 23, all substantially as disclosed in the above mentioned prior patent. The output of pump 22 is supplied to the servo motor 9 through the shut-off and regulating valve 17 having a control handle 17' which may be adjusted so that the oil or other operating fluid used may either be shut off or its rate of flow regulated so that the speed of operation of the servo motor 9, and hence that of rudder 23, may be adjusted as desired. Valve 17 is provided with additional handles 17" and 17''' for individually controlling the rate of operation of the aileron and elevator servo motor (not shown).

A follow back connection from the rudder servo motor 9 to the gyro control is provided by flexible wire or cable 10 passing over pulley 11 on the directional gyroscope, which pulley turns one arm of a differential 13 through shaft 12, worm 14 and worm wheel 15. A second arm of differential 13 is connected through gearing 16 to the turnable framework 7 having the ports or air nozzles 6, 6' therein.

Preferably, the magnetic compass steering control of the gyroscope base line is brought in through the same differential 13. To accomplish this, a magnetic compass 24 is provided (see Figs. 6 to 8), having a casing 25 within the base portion of which is journaled an angularly adjustable air bearing pedestal 26 having a semispherical concave upper bearing surface for receiving the lower semispherical convex surface 31 of the sensitive element 27 carrying the permanent magnets 28. The bottom of casing 25 is centrally apertured and provided with a screen 29, through which air is adapted to pass into the hollow interior of the pedestal 26 and upwardly through vertical passages 30 in this pedestal to the lower semispherical bearing surface 31 of the element 27. Thus, air passing up through passages 30 serves to support convex bearing surface 31 upon the concave upper bearing surface of the member 26, a film of air being thusly provided between these bearing surfaces and enabling the utmost freedom of movement of the sensitive element 27. Air is withdrawn from casing 25 through pipes 32 and 32', as will further appear.

The sensitive element 27 is retained in cooperative relation with the concave bearing of bearing pedestal 26 by means of an adjustable screw 34 carried by an arm 35 fixed on pedestal 26 and extending upwardly between magnets 28 and over the sensitive element. Screw 34 has a recessed lower shank providing a jewel bearing cooperating with the upper extension of vertical pin 36 fixed upon the sensitive element 27. The lower portion of pin 36 projects into a central passage 37 provided in the air bearing pedestal 26 and serves to limit the angle of tilting of sensitive element 27 by contacting with the walls of the passage 37. This passage is in communication with a radially directed port or nozzle 38 in the sensitive element, which port normally directs air outwardly between the two vanes 39 and 39' that are pivoted on a pin 40 carried by the bearing pedestal 26. These vanes have arms 41, 41' cooperating with ports 42 and 42' which lead to the annular passages 59, 59' communicating with pipes 32 and 32', respectively. Spring elements 43 are shown attached to the upper ends of vanes 39, 39' for normally withdrawing the arms 41, 41' of these vanes away from the ports 42, 42', thereby allowing free flow of air out of casing 25 into pipes 32, 32'. In the event that the air blast from the port 38 should be directed upon one of the vanes, such as 39' for example, this vane will be swung clockwise as viewed in Fig. 8, thereby causing its arm 41' to close the entrance to port 42' and shutting off the flow of air through pipe 32'.

An annular card 44 is carried by a U-bracket 45 attached to the upper surface of the sensitive element 27. Card 44 is ordinarily not graduated, inasmuch as the compass 24, as a general rule, is installed in some convenient location on the craft where it is least influenced by other equipment or parts tending to set up stray fields or tending to distort the earth's field, so that this compass would ordinarily not be observed by the pilot or navigator, and hence the card 44 need have but a single mark or line 46 thereon (see Fig. 7), which mark cooperates with a lubber mark or marks 47 provided on an annular bezel 48 carried by the top of casing 25 below the transparent face 49. A reference disc 50 is fixed upon the top of arm 35 and is also provided with a reference mark 51 for cooperating with marks 46 and 47.

In order to provide for changing course, the air bearing pedestal 26 is cut circumferentially to provide a worm wheel 52 that is engaged by a worm 53 whose shaft 54 is connected to a flexible shaft 55 extending to any convenient position for manual control in the craft, such as the pilot's dash, and connected thereat to a shaft 56 of the course changing knob 57 (see Figs. 1, 2, 3 and 5) forming a part of the course changing unit 58. The pipes 32 and 32' also extend from compass 24 to the course changing unit 58, at the rear of which is provided a cylinder valve having a cylinder 62 turnable by a lever 63 at the front of the instrument, which lever is connected through shaft 63' and gearing 64 to the valve cylinder 62. With valve lever 63 in "on" position shown in Fig. 2, the pipes 32, 32' are respectively connected by cylinder 62 to pipes 65, 65' extending to the directional gyroscope, so that normally, with ports 42, 42' of the compass 24 both open, air is sucked equally through pipes 32, 32' through valve 62 and through pipes 65, 65' to a pair of small nozzles 66, 66' which direct streams of air against oppositely acting, small turbine wheels 67, 67'. Nozzles 66, 66' are within an air tight casing 69 surrounding the directional gyroscope, from which air is continuously pumped through outlet 71. Turbine wheels 67, 67' are fixed on a common shaft 73 so that with equal streams of air impinging on wheels 67, 67', shaft 73 does not turn. However, should the velocity of these streams become unequal due to operation of one of the vanes 39 or 39' of compass 24, then shaft 73 will drive through reduction gearing 72 to rotate shaft 74, worm 75, worm wheel 76, the third arm of differential 13, and gearing 16, to thereby slowly turn the framework 7 carrying the air pick-off nozzles 6, 6', to effect a change in the base line of the gyroscope.

The course changing unit or instrument 58 is provided with a compass card 77, the upper half of which is visible through the window 78 at the front of the instrument. Card 77 is carried by a sleeve 79 turnably mounted on a fixed pin 80, which sleeve has a worm wheel 81 fixed thereon and meshing with a worm 82 whose shaft is driven by bevel gearing 83 from course changing shaft 56. A vernier dial 84 is positioned in front of card 77 and provided with a scale 85 divided into ten one-degree divisions, a complete revolution of dial 84 corresponding to a movement of card 77 through the space between two consecutive divisions thereof. Dial 84 is turnably mounted on pin 80 and has a gear 85' secured thereto that is driven from shaft 56 through pinion 87 and idler 86.

In installing the compass 24 and the course changing unit 58 in an aircraft, the compass is preferably located where the same is least apt to be affected by acceleration forces and by extraneous magnetic fields or by objects tending to distort the earth's field. If desired, the compass sensitive element 27 may be stabilized by mounting the same on the directional gyroscope or on a separate gyro vertical, as disclosed in Patent No. 2,091,964 of September 7, 1937, to Leslie F. Carter. The craft is positioned so that its heading is magnetic north, i. e., so that mark 46 of the compass card is aligned with the lubber lines 47 and with the mark 51 on reference disc 50, as shown in Fig. 7. The compass card 77 and vernier dial 84 of the course changing unit are also set at magnetic north, as shown in Fig. 2, whereupon the ends of flexible shaft 55 are connected to the compass and course changing unit shafts 54 and 56.

With the directional gyro also set on the north course, the craft will fly due north, but should the directional gyro start to wander, thereby turning the craft from a magnetic north course, the magnetic compass will detect such turning and the sensitive element 27 thereof, by directing the air jet from port 38 predominantly against one of the vanes 39 or 39′, depending upon the direction of departure of the craft, will cause a differential air flow through ports 42, 42′, pipes 32, 32′; 65, 65′, and nozzles 66, 66′ to cause one of the turbine wheels 67 or 67′ to rotate and drive reduction gearing 72, shaft 74, worm and wheel 75, 76, and differential 13 to effect turning of framework 7 and nozzles 6, 6′, thereby changing the base line of the gyroscope. The turning of ports 6, 6′ with respect to cut-off disc 5 causes a differential air flow in passages 8, 8′ and in connected pipes 19, 19′, thereby causing relay 20 to operate master valve 21 to effect operation of servo motor 9 and rudder 23 to bring the craft back onto its correct north course, the follow-back connection 10, 12, 13 serving to hold the craft on the course without hunting.

When it is desired to change course, it is merely necessary to turn the knob 57 of the course changing unit 58 so that the desired course is indicated on compass card 77 and vernier dial 84 as read against index marks 89, 89′. In so turning knob 57, the flexible shaft 55 is also turned to cause a corresponding turning of compass air bearing pedestal 26, thereby causing sensitive element 27 to direct the air jet from port 38 against the proper vane 39 or 39′, as the case may be, and effect the desired change in the base line of the directional gyroscope, and the resulting change in course of the craft to correspond to that shown by the course changing unit. Course may be changed at the directional gyroscope by turning knob 90 fixed on shaft 74, if desired, especially where a fairly quick turn is desired. If a permanent change in course is desired, it is obviously also necessary to turn the knob 57, since otherwise the magnetic compass will cause a slow return to the original course.

Undue amplitude of swinging of the compass sensitive element 27 is prevented by magnets 28 contacting opposite sides of arm 35. Owing to the use of the turbine wheels 67, 67′, reduction gearing 72 and worm and wheel gearing 75, 76, the base line of the directional gyroscope is unaffected by temporary deviations or oscillations of the magnetic compass, the gyroscope ports 6, 6′ assuming a position corresponding to the mean position of the compass sensitive element 27. Any temporary inaccuracy that may be set up in the system due to the effect of making turns on the magnetic compass may be eliminated by throwing lever 63 to "off" position or toward the left in Fig. 2 during turns, thereby closing cylinder valve 62 and temporarily stopping the flow of air to nozzles 66, 66′. When this is done, however, it is obvious that the turn must be made by turning course change knob 90 or by turning the rudder directly by hand, as well as turning knob 57, in each case, since the control of course from knob 57 is temporarily interrupted.

If the sensitive element is gyroscopically stabilized, no inaccuracy will develop during turns and it will be unnecessary to turn the cylinder valve 62 off.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an automatic steering means for craft, a free gyroscope, means controlled therefrom for steering the craft, a magnetic compass, course changing means for setting the course thereon, automatic means, controlled from said magnetic compass upon deviation of the craft from the course set with respect thereto, to change the base line of the gyroscope and effect the return of the craft to the set course, and means for rendering said automatic means inoperative at will.

2. In an automatic steering means for craft, a free gyroscope, means controlled therefrom for steering the craft, a magnetic compass, dual course changing means for setting the course at the magnetic compass and at the gyroscope, automatic means, controlled from said magnetic compass upon deviation of the craft from the course set with respect thereto, to change the base line of the gyroscope and effect the return of the craft to the set course, and means adjacent said course changing means for rendering said automatic means inoperative during turns.

3. In an automatic pilot for aircraft, a rudder servomotor, a directional gyroscope, a pneumatic pick-off from said gyroscope having an adjustable base line for controlling the operation of said servomotor, a magnetic compass, means for setting course on said compass, and a pneumatic pick-off from said compass connected for controlling the base line of said gyroscope pick-off to thereby put the craft on the set course, said pick-off including means for discharging an air jet from said compass, pivoted shutters adjacent thereto to be differentially intercepted thereby, ports adjacent said shutters adapted to be differentially opened and closed thereby, and means operated by the pressure differences created by such differential opening and closing of said ports for turning said pick-off at the gyroscope with respect to said gyroscope.

4. In an automatic pilot for aircraft, a rudder servomotor, a directional gyroscope, a pneumatic pick-off from said gyroscope having an adjustable base line for controlling the operation of said servomotor, a magnetic compass, remote control means for setting course on said compass, a second servomotor at the gyroscope and a pneumatic pick-off from said compass connected for operating said second servomotor to change the course, upon departures of the craft from the set course being detected by said compass, whereby the pick-off thereof causes correction of the base line of said gyroscope through said second servomotor to return the craft to the set course.

5. In an automatic pilot for aircraft, a rudder servomotor, a directional gyroscope, a pneumatic pick-off from said gyroscope having an adjustable base line for controlling the operation of said servomotor, a magnetic compass, remote control means for setting course on said compass, a pneumatic pick-off from said compass connected for slowly controlling the base line of said gyroscope pick-off to thereby put the craft on the set course, departures of the craft from the set course being detected both by said gyroscope and said compass, whereby the pick-off at the latter causes correction of the base line of said gyroscope to correct for a continued departure of the craft from the set course due to gyro wander, and a follow-back connection from said servomotor to said gyroscope pick-off to prevent hunting of the craft on its course.

6. In an automatic pilot for aircraft, a free gyroscope, a relay controlled from said gyroscope, a source of liquid under pressure, a control surface, a servomotor supplied from said pressure source for operating said control surface a hydraulic valve actuated by said relay and connected in the liquid supply of said servomotor for controlling the operation of said servomotor, and additional valve means in said fluid supply for controlling the rate of movement of said servomotor and of said control surface.

7. In an automatic pilot for aircraft, a directional gyroscope, a magnetic compass, an air pick-off from said compass, a pair of oppositely acting turbines at said gyroscope, piping connecting said pick-off to said turbines, an air pick-off at said gyroscope for controlling the steering of the craft, and reduction gearing interposed between said turbines and said gyroscope pick-off for changing the base line thereof at a slow enough rate to integrate temporary oscillations of the magnetic compass.

8. In an automatic pilot for aircraft, a directional gyroscope, a magnetic compass, an air pick-off from said compass, means for setting course on said compass, a pair of oppositely acting turbines at said gyroscope, piping connecting said pick-off to said turbines, valve means in said piping for shutting off the supply of air to said turbines at will, an air pick-off at said gyroscope for controlling the steering of the craft, reduction gearing interposed between said turbines and said gyroscope pick-off for changing the base line thereof at a slow enough rate to integrate temporary oscillations of the magnetic compass, and additional means for directly shifting said last named pick-off for quick turns.

9. In an automatic pilot for craft, a magnetic compass sensitive element, a rotatably mounted air bearing pedestal for supporting said element from below, a projection on said element cooperable with said bearing pedestal for limiting tilting movements of said element about a horizontal axis, screw means providing a thrust bearing for retaining said element in cooperative relation with said air bearing pedestal, said element having an air pick-off port, said air bearing pedestal and said element having communicating passages for supplying air to said port, shutters on said pedestal adapted to be engaged by the jet issuing from said port, aid pedestal having ports adapted to be differentially opened and closed by said shutters, and means indirectly operated by the pressure differences so created for steering the craft.

10. In an automatic pilot for aircraft, a rudder servomotor, a directional gyroscope, a pneumatic pick-off from said gyroscope having an adjustable base line for controlling the operation of said servomotor, a magnetic compass, means for setting course on said compass, an air jet movable with said compass, port controlling vanes normally disposed on opposite sides of said air jet, pneumatic means at the directional gyroscope for slowly shifting the base line thereof, and piping connecting the ports controlled by said vanes to said motive means for correcting the course set by said gyroscope.

11. In an automatic pilot for craft, a rotatably mounted support, means for turning the same for changing course, a magnetic element, an air flow bearing pivotally supporting said element on said support, said element having an orifice, means for causing air flow through said bearing and orifice, shutters on said support adapted to be engaged by the jet from said orifice, said support having ports adapted to be differentially opened and closed by said shutters, and means indirectly operated by pressure differences so created for steering the craft.

12. In an automatic pilot for craft, a rotatably mounted support, means for turning the same for changing course, a magnetic element, a semi-spherical air flow bearing pivotally supporting said element on said support, an inverted thrust jewel bearing for retaining said magnetic element in cooperative relation with said air bearing, said element having an orifice, means for causing air flow through said bearing and orifice, shutters on said support adapted to be engaged by the jet from said orifice, said support having ports adapted to be differentially opened and closed by said shutters, and means indirectly operated by pressure differences so created for steering the craft.

13. A magnetic compass controller for automatic pilots as claimed in claim 11, in which said support and magnetic element have cooperating parts acting to limit the swing of the compass under adverse conditions.

14. In an automatic steering means for craft, a free gyroscope, means controlled therefrom for steering the craft, a magnetic compass adapted to be located remote from the panel, course changing means adapted to be located on the panel for setting the course thereon, automatic means, controlled from said magnetic compass upon deviation of the craft from the course set with respect thereto, to change the base line of the gyroscope and effect the return of the craft to the set course, and a dummy compass card adjacent said course change means and actuated therefrom.

BERT G. CARLSON.